(12) United States Patent
Kalofonos et al.

(10) Patent No.: US 8,037,519 B2
(45) Date of Patent: Oct. 11, 2011

(54) APPARATUS AND METHOD FOR MANAGING ACCESS TO ONE OR MORE NETWORK RESOURCES

(75) Inventors: Dimitris Kalofonos, Cambridge, MA (US); Franklin Reynolds, Bedford, MA (US)

(73) Assignee: Nokia Corporation, Espoo (FI)

( * ) Notice: Subject to any disclaimer, the term of this patent is extended or adjusted under 35 U.S.C. 154(b) by 941 days.

(21) Appl. No.: 11/848,702

(22) Filed: Aug. 31, 2007

(65) Prior Publication Data

US 2009/0059952 A1 Mar. 5, 2009

(51) Int. Cl.
*G06F 9/00* (2006.01)
*G01R 31/08* (2006.01)
(52) U.S. Cl. .......................... 726/13; 370/229
(58) Field of Classification Search ............... 726/13; 370/229
See application file for complete search history.

(56) References Cited

U.S. PATENT DOCUMENTS

| | | | |
|---|---|---|---|
| 6,366,578 B1* | 4/2002 | Johnson | 370/353 |
| 6,400,711 B1* | 6/2002 | Pounds et al. | 370/353 |
| 6,510,509 B1* | 1/2003 | Chopra et al. | 712/13 |
| 7,734,909 B1* | 6/2010 | Roush et al. | 713/154 |
| 2003/0172145 A1* | 9/2003 | Nguyen | 709/223 |
| 2003/0208533 A1* | 11/2003 | Farquharson et al. | 709/203 |
| 2005/0055435 A1* | 3/2005 | Gbadegesin et al. | 709/224 |
| 2006/0267802 A1* | 11/2006 | Judge et al. | 340/995.1 |
| 2006/0288227 A1 | 12/2006 | Kalofonos et al. | |
| 2006/0294194 A1 | 12/2006 | Graveline et al. | |
| 2007/0140128 A1* | 6/2007 | Klinker et al. | 370/238 |
| 2008/0040151 A1* | 2/2008 | Moore | 705/2 |
| 2010/0161362 A1* | 6/2010 | Shapira et al. | 705/7 |

FOREIGN PATENT DOCUMENTS

EP 1 598 729 A 11/2005
WO WO 2006/0134476 A 12/2006

OTHER PUBLICATIONS

International Search Report for PCT/IB2008/053360, dated Mar. 16, 2009.
Kalofonos et al., MyNet: A Platform for Secure P2P Personal and Social Networking Services, Percom, pp. 135-146, 2008, IEEE.
Ford et al., Persistent Personal Names for Globally Connected Mobile Devices, In Proceedings of 7Th USENIX Symposium on Operating Systems Design and Implementation (Osdi'06), Oct. 11, 2006, Seattle, WA.

(Continued)

*Primary Examiner* — Techane Gergiso
(74) *Attorney, Agent, or Firm* — Alston & Bird LLP

(57) ABSTRACT

An apparatus is provided that includes a processor configured to receive a captured traffic unit (CTU) intended for a network service, the CTU being one into which incoming traffic has been assembled based on a filter describing which incoming traffic to capture and how to assemble the respective incoming traffic into the CTU. The processor is also configured to determine whether to allow the CTU to pass to one or more applications configured to implement the respective network service based on a passlet including permissions to a particular user. The processor is further configured to instruct a firewall to allow the CTU to pass to the respective one or more applications or to reject the CTU based on the determination. In this regard, the processor is configured to perform the above functions under control of a security framework implemented in middleware between a user-level domain and a system-level domain.

22 Claims, 7 Drawing Sheets

OTHER PUBLICATIONS

Bauer et al., A Language and System for Composing Security Policies, Princeton University Technical Report TR-699-04, Oct. 1, 2007, http://www/ece.cmu.edu/~lbauer/papers/polymer-tr-699-04.pdf.

Burns et al., Automatic Management of Network Security Policy, http://ieeexplore.ieee.org/Ie15/7418/20160/00932156.pdf, F30602-99-C-0182, 2001 IEEE.

Munz et al., Diadem Firewall: Web Server Overload Attack Detection and Response, http://www.Diadem-Firewall.Org/Publications/BBEurope-DIADEM.Pdf, Oct. 12, 2005, Bordeaux, France.

Mizuno et al., A New Remote Configurable Firewall for Home-Use Gateways, Consumer Communications and Networking Conference 2005, CCNC. Second IEEE, Jan. 3, 2005, pp. 599-601.

Dimitrakos et al., Policy-Driven Access Control Over a Distributed Firewall Architecture, Proceedings of the 3rd International Workshop on Policies for Distributed Systems and Networks (Policy'02), Oct. 8, 2002.

Firewall Builder, http://www.fwbuilder.org, Jan. 7, 2008.

* cited by examiner

Defined in UPnP Media Server SMD

| 5. service id | ContentDirectory:1 | | 5. service id | ConnectionManager:1 | | 5. service id | None |
|---|---|---|---|---|---|---|---|
| 4. service invocation | SOAP | | 4. service invocation | SOAP | | 4. service invocation | None |
| 3. service transport | HTTP | | 3. service transport | HTTP | | 3. service transport | HTTP |
| 2. transport | TCP port 8080 | | 2. transport | TCP port 8080 | | 2. transport | TCP port 8080 |
| 1. IP | IP | | 1. IP | IP | | 1. IP | IP |

UPnP Media Server Content Directory SMD filter
UPnP Media Server Connection Manager SMD filter
UPnP Media Server Content Transfer SMD filter

Defined in Webcam SMD

| 5. service id | None | | 5. service id | None |
|---|---|---|---|---|
| 4. service invocation | SSDP | | 4. service invocation | None |
| 3. service transport | HTTPU | | 3. service transport | None |
| 2. transport | UDP port 1900 | | 2. transport | UDP port 32227 |
| 1. IP | IP | | 1. IP | IP |

UPnP Service Discovery SMD filter
Webcam SMD filter

Defined in Web Browsing SMD

| 5. service id | None |
|---|---|
| 4. service invocation | None |
| 3. service transport | HTTP |
| 2. transport | TCP port 80 |
| 1. IP | IP |

Web Browsing SMD filter

Defined in security middleware

| 5. service id | None |
|---|---|
| 4. service invocation | None |
| 3. service transport | None |
| 2. transport | None |
| 1. IP | UIA-IPv6 |

Default SMD filter

FIG. 5.

APPARATUS AND METHOD FOR MANAGING ACCESS TO ONE OR MORE NETWORK RESOURCES

FIELD OF THE INVENTION

Exemplary embodiments of the present invention generally relate to network security, and more particularly, relate to an apparatus and method for managing access to one or more network resources including one or more network devices, services or content.

BACKGROUND OF THE INVENTION

Applications based on the distributed request/response computing model are already becoming part of consumers' everyday life. Examples include browsing and sharing content with friends on the Web, home entertainment offered by Digital Living Network Alliance (DLNA)-compliant consumer electronics devices, home automation and webcam applications, and a number of Web Services. Furthermore, the proliferation of new enabling technologies, such as peer-to-peer overlay networks, will enable non-expert consumers to easily create their personal networks of devices and content, and share them with people in their social environment, again using applications based on the distributed request/response model.

As consumers' interaction with distributed systems becomes pervasive, so do the dangers of exposing their resources to malicious attacks and exploits that are already abundant in the Internet. Since most users are non-experts, they are unaware of how their systems operate, existing threats to their systems, and the exact security consequences of their actions. Furthermore, most current security countermeasures require significant expertise (e.g., managing access control lists—ACLs, certificates, encryption keys) and infrastructure (e.g., Certification Authorities, authentication servers) to operate, which makes them non-applicable or non-usable in everyday consumer scenarios. In addition, many of the distributed applications and middleware in use do not implement a security framework at all, often under the assumption that perimeter security (e.g., firewalls) or lower-layer (e.g., link-layer or network-layer) security will protect them from attacks. Consumers are approaching a point of time where large numbers of non-expert users will be able to easily share (and expose to threats) their devices, services, and content over distributed applications that don't implement security or whose security is turned-off or mis-configured.

Clearly, a security framework that would allow non-expert consumers to make intuitive security decisions that protect their resources shared by legacy distributed applications, would be very beneficial.

SUMMARY OF THE INVENTION

In light of the foregoing background, exemplary embodiments of the present invention provide an improved apparatus, method and computer-readable storage medium for accessing one or more network resources, including one or more network devices, services or content. Generally, exemplary embodiments of the present invention provide a security framework for consistent and intuitive user interaction to manage access control in smart-spaces or between personal networks. The security framework of exemplary embodiments of the present invention manages access control of distributed request/response architectures, and provides a security mechanism operable on top of legacy distributed applications and middleware, regardless of any specific underlying security mechanisms.

According to one aspect of exemplary embodiments of the present invention, an apparatus is provided that includes a processor configured to perform a number of functions under control of a security framework implemented in middleware between a user-level domain and a system-level domain. In this regard, the processor is configured to receive a captured traffic unit (CTU) intended for a network service. In this regard, the CTU is one into which incoming traffic has been assembled based on a filter (e.g., Service Mapping Document (SMD) filter) describing which incoming traffic to capture and how to assemble the respective incoming traffic into the CTU. This filter may comprise one of a list of filters according to which incoming traffic is to be assembled into different CTUs for different network services.

The processor is also configured to determine whether to allow the CTU to pass to one or more applications configured to implement the respective network service based on a passlet that includes one or more access permissions to a particular user for accessing the respective network service, or for accessing a device hosting the respective network service. The processor is also configured to instruct a firewall to allow the CTU to pass to the respective one or more applications or to reject the CTU based on the determination.

In addition to a passlet, the processor may be configured to determine whether to allow the CTU to pass further based on a service mapping document (SMD) for the respective network service, the SMD describing how to map one or more user-level permissions to one or more corresponding system-level actions. The filter from which the incoming traffic is assembled into the CTU may be derived from this SMD.

The processor may be configured to receive a CTU intended for a network service hosted by a device within a personal network including a plurality of devices. In such instances, each device within the personal network may be configured to host one or more services, and include a firewall configured to allow CTUs to pass to one or more applications configured to implement the respective one or more services.

The application(s) to which the CTU may be passed may include legacy application(s) designed and operable without regard to the security framework. In one such instance whereby support has been added to the security framework for an application (e.g., for an "enabled" service), a SMD and filter may exist such that the processor may be configured to receive a CTU into which incoming traffic has been assembled based on a filter associated with the respective network service. In another instance whereby the security framework is unaware of an application (e.g., for a "transparent service), the processor may be configured to receive a CTU into which incoming traffic has been assembled based on a default filter unassociated with any network service. The processor may then be configured to determine whether to allow the CTU to pass to the respective application based on a device passlet including one or more access permissions to a particular user for accessing a device hosting the respective network service.

According to other aspects of the present invention, a method and computer-readable medium are provided. Embodiments of the present invention therefore provide an apparatus, method and computer-readable storage medium for managing access to one or more network resources. As indicated above, and explained below, exemplary embodiments of the present invention may solve problems identified by prior techniques and provide additional advantages.

BRIEF DESCRIPTION OF THE DRAWINGS

Figure 1:
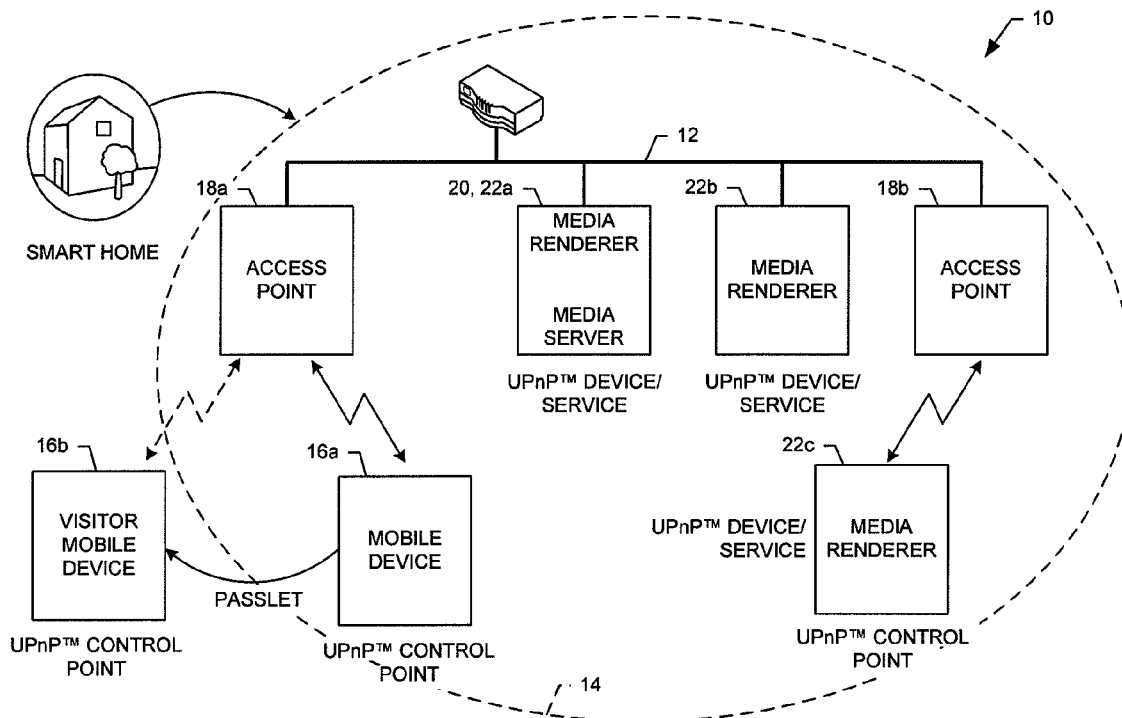
Figure 2:
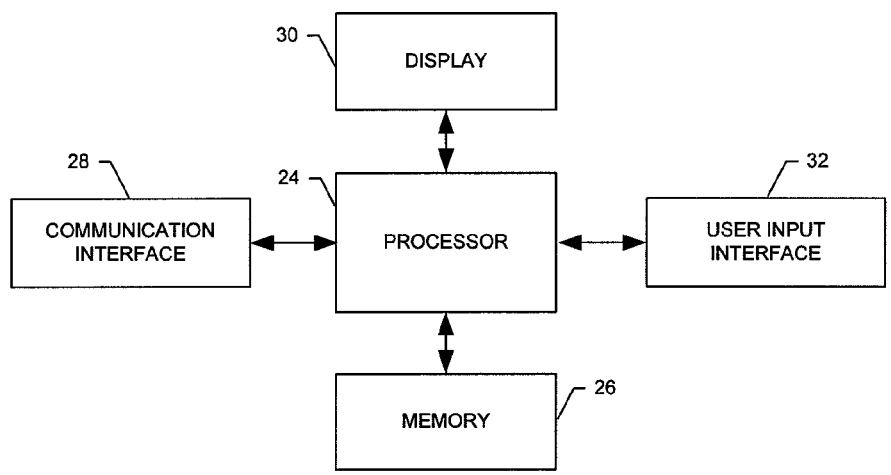
Figure 3:
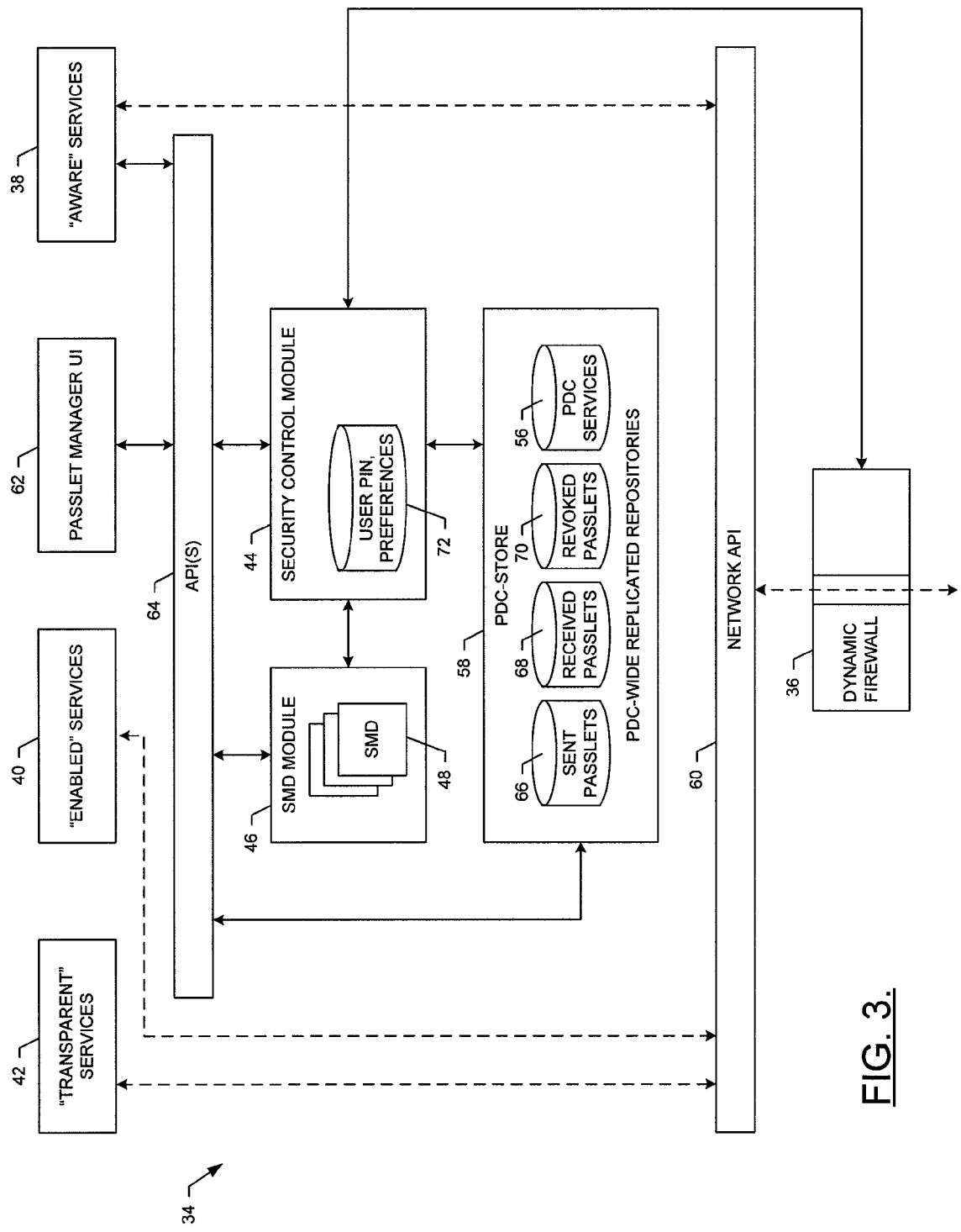
Figure 4:
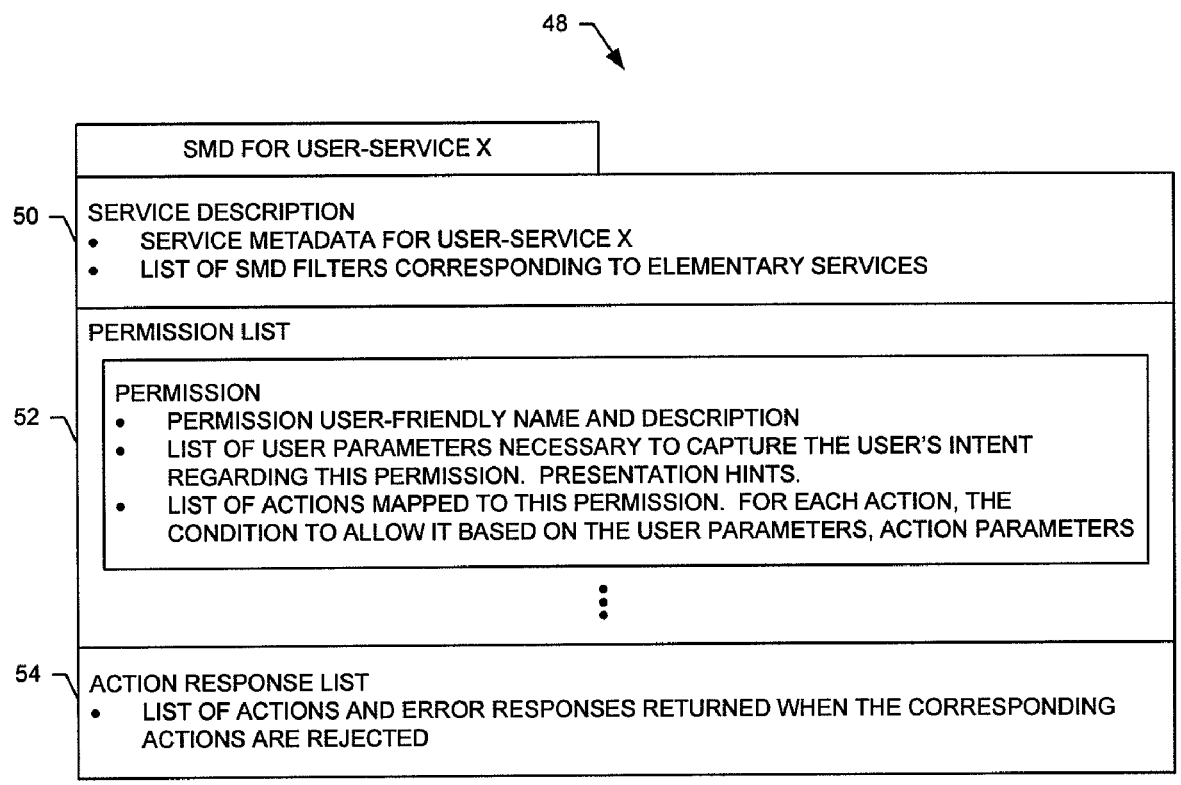
Figure 6:
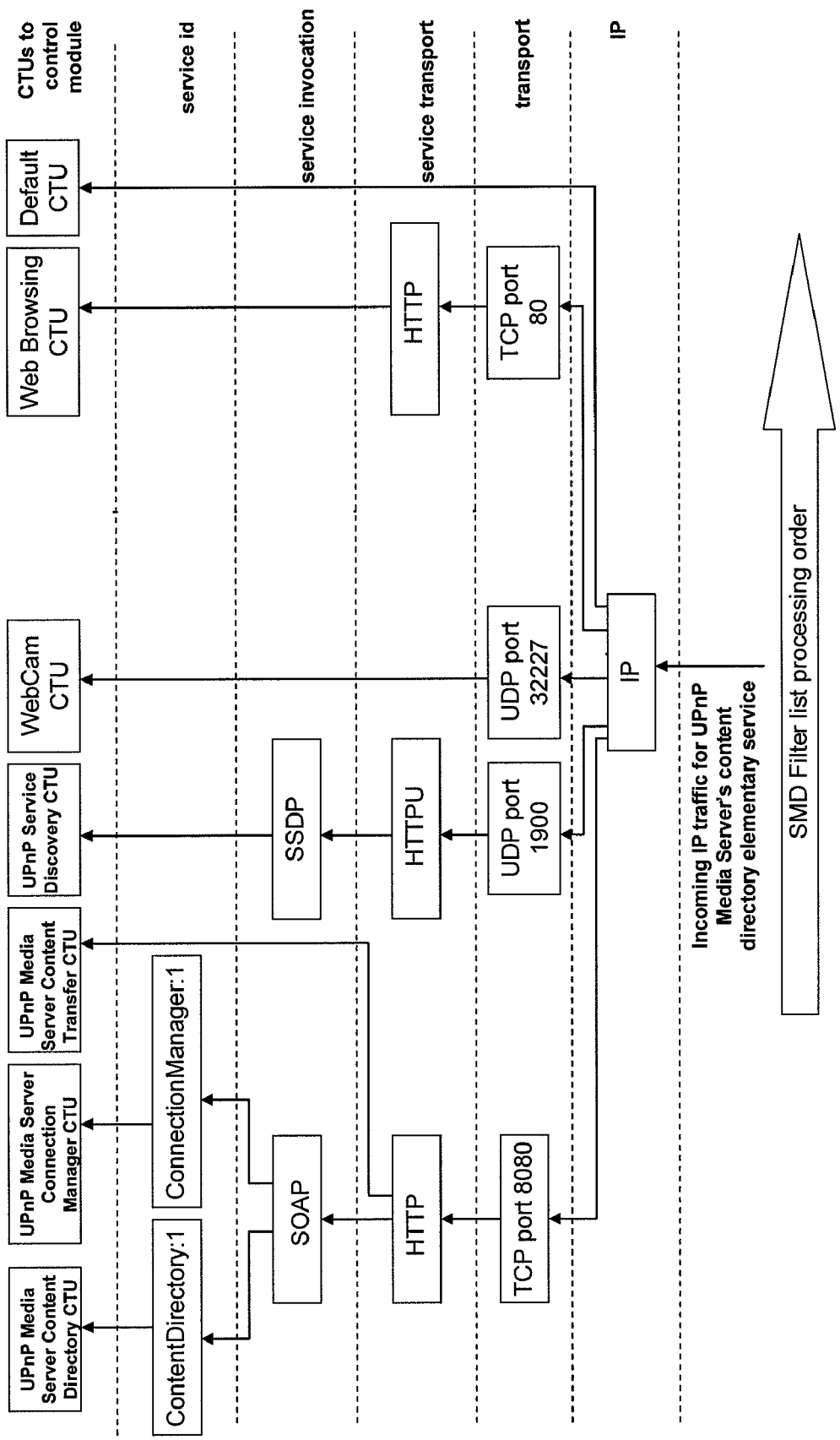
Figure 7:
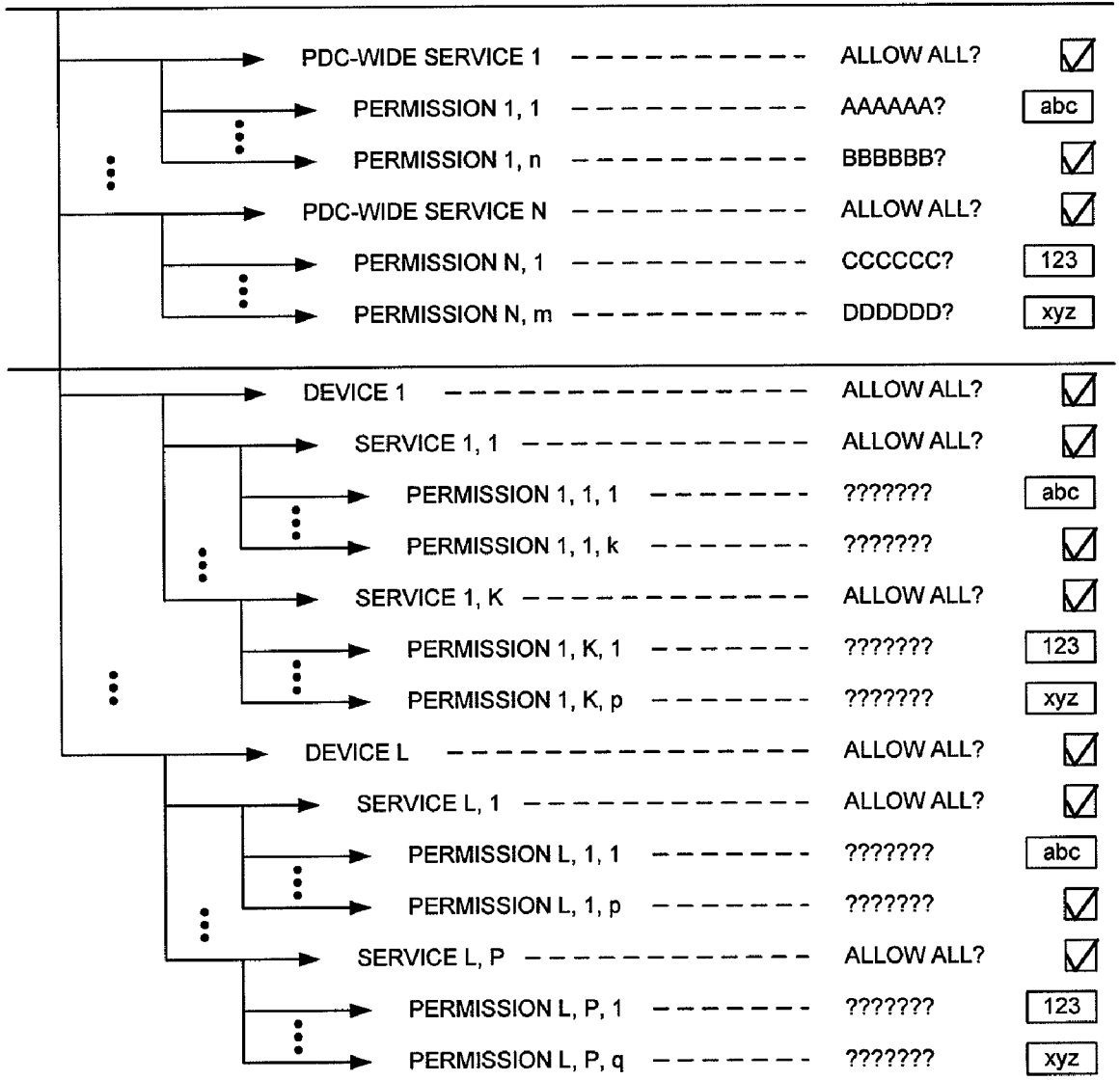
Figure 8:
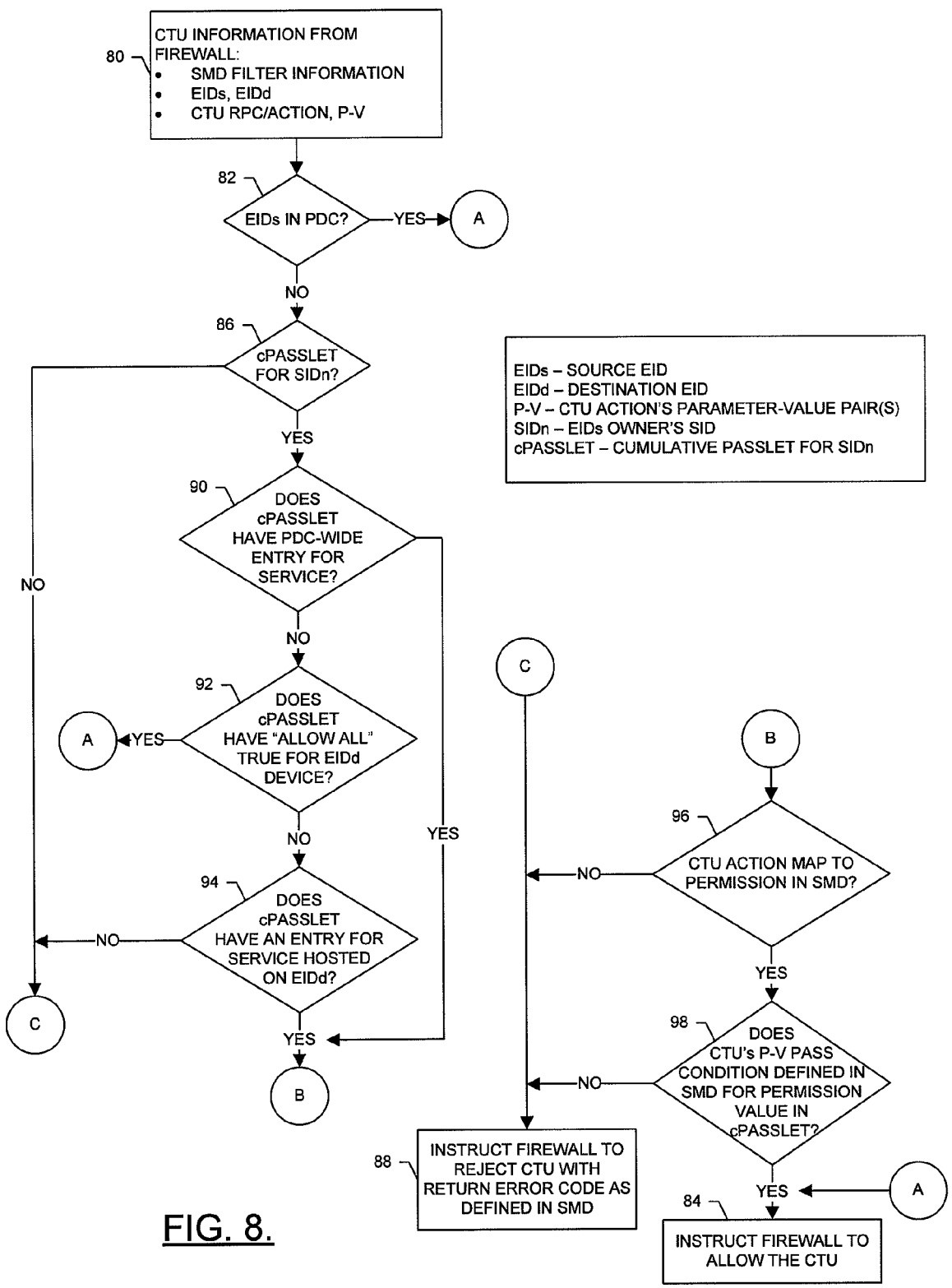

Having thus described the invention in general terms, reference will now be made to the accompanying drawings, which are not necessarily drawn to scale, and wherein:

FIG. 1 is a block diagram of a system and a mobile terminal that may benefit from exemplary embodiments of the present invention;

FIG. 2 is a schematic block diagram of an entity that may be configured to operate as a mobile device, access point, media server and/or media renderer, in accordance with exemplary embodiments of the present invention;

FIG. 3 is a functional block diagram of a security framework according to exemplary embodiments of the present invention;

FIG. 4 illustrates an exemplary service mapping document (SMD) according to exemplary embodiments of the present invention;

FIG. 5 illustrates exemplary SMD filters derivable from SMDs according to exemplary embodiments of the present invention;

FIG. 6 is a control flow diagram illustrating a process by which a firewall may assemble incoming traffic into captured traffic units (CTUs) based on SMD filters illustrated in FIG. 5;

FIG. 7 illustrates an exemplary cumulative passlet according to exemplary embodiments of the present invention; and FIG. 8 is a flowchart including various steps in a method of managing access to a network resource according to one exemplary embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Reference is now made to FIG. 1, which illustrates a system 10 that is configured in accordance with exemplary embodiments of the present invention. In accordance with exemplary embodiments of the present invention, the system includes one or more physical devices or apparatuses coupled to one or more networks. As shown in FIG. 1, the system includes one or more physical devices that may be coupled to a local area network (LAN) 12, which may itself be coupled to one or more other networks including, for example, one or more other LANs, and/or one or more personal area networks (PANs), metropolitan area networks (MANs), wide area networks (WANs) such as the Internet or the like. Additionally or alternatively, the LAN may be coupled to one or more cellular networks, such as any one or more of a number of first-generation (1G), second-generation (2G), 2.5G and/or third-generation (3G) cellular networks.

As shown, the system may include one or more mobile devices 16 (e.g., mobile devices 16a, 16b) coupled to the LAN 12 via one or more wireless access points 18 (APs) (e.g., APs 18a, 18b), although one or more of the mobile devices may alternatively be coupled to the LAN via one or more other networks (e.g., the Internet, a cellular network, etc.). The APs can be configured in accordance with any of a number of different communication techniques. For example, the access point(s) can generally be configured to communicate with the mobile devices in accordance with one or more radio frequency (RF) techniques, and can more particularly be configured to communicate with the mobile devices in accordance with Bluetooth, wireless LAN (WLAN), and/or Ultrawideband (UWB) techniques, for example.

In addition to the mobile devices 16 and APs 18, the system 10 may further include one or more other physical devices coupled to the LAN 12, and thus the mobile devices via respective APs. These other devices can be coupled to the LAN in any of a number of different manners. For example, one or more of these other devices can be directly coupled to the LAN, or indirectly coupled to the LAN via one or more APs. One or more of these devices may be configured to function as a media server 20 and/or media renderer 22 (e.g., media renderers 22a, 22b, 22c). As shown, any one of these other devices may function as either a media server or media renderer, or may function as both a media server and a media renderer.

Devices configured to function as a media server 20 may include any of a number of different devices configured to provide content acquisition, recording, storage and/or sourcing capabilities. For example, the media servers may include set-top boxes (STBs), personal video recorders (PVRs), PCs, stereo and home theaters that include non-volatile memory (e.g., music servers), broadcast tuners, video and imaging capture devices (e.g., cameras, camcorders, etc.), and/or multimedia mobile terminals (e.g., mobile telephones, portable digital assistants (PDAs), pagers, laptop computers, etc.). The devices configured to function as a media player 22 may include any of a number of different devices configured to provide playback and/or rendering capabilities. For example, the media players may include television (TV) monitors, wireless monitors, game consoles, printers, PCs, stereo and home theaters, video and imaging capture devices, and/or multimedia mobile terminals. As can be seen, in various instances, one or more devices may be configured to function as both a media server and a media player.

Referring now to FIG. 2, a block diagram of an entity that may be configured to function as a mobile device 16, AP 18, media server 20 and/or media renderer 22 is shown in accordance with one embodiment of the present invention. Although shown as separate entities, in some embodiments, one or more entities may support one or more of a mobile device, AP, media server and/or media renderer, logically separated but co-located within the entit(ies). As shown in FIG. 1 and explained above, for example, a single entity may support a logically separate, but co-located, media server and media renderer. Also, for example, a single entity may support a logically separate, but co-located mobile device and media server and/or media renderer.

The entity that may be configured to operate as one or more of a mobile device 16, AP 18, media server 20 and/or media renderer 22 may include various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. More particularly, for example, as shown in FIG. 2, the entity may include a processor 24 connected to a memory 26. The memory include comprise volatile and/or non-volatile memory. The non-volatile memory may comprise embedded and/or may be removable non-volatile memory, and may include, for example, embedded or removable multimedia memory cards (MMCs), Memory Sticks manufactured by Sony Corporation, EEPROM, flash memory, hard disk or the like. The memory typically stores content, data or the like. For example, the memory typically stores content transmitted from, and/or received by, the entity. Also for example, the memory typically stores software applications, instructions or the like for the processor to perform functions associated with operation of the entity in accordance with exemplary embodiments of the present invention.

Although described herein as being implemented in software, it should be understood that any one or more of the functions described herein may alternatively be implemented in firmware or hardware, without departing from the spirit and scope of the present invention. Generally, then, the mobile device 16, AP 18, media server 20 and/or media renderer 22 may include means, such as one or more logic elements for performing various functions. As will be appreciated, the logic elements can be embodied in any of a number of different manners. In this regard, the logic elements performing the respective functions can be embodied in an integrated circuit assembly including one or more integrated circuits integral or otherwise in communication with a respective network entity (i.e., mobile device, AP, media server, media renderer, etc.) or more particularly, for example, a processor 24 of the respective network entity. The design of integrated circuits is by and large a highly automated process. In this regard, complex and powerful software tools are available for converting a logic level design into a semiconductor circuit design ready to be etched and formed on a semiconductor substrate. These software tools automatically route conductors and locate components on a semiconductor chip using well established rules of design as well as huge libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the memory 26, the processor 24 may also be connected to at least one interface or other means for displaying, transmitting and/or receiving data, content or the like. In this regard, the interface(s) can include at least one communication interface 28 or other means for transmitting and/or receiving data, content or the like, as well as at least one user interface that can include a display 30 and/or a user input interface 32. The user input interface, in turn, can comprise any of a number of devices allowing the entity to receive data from a user, such as a keypad, a touch display, a joystick or other input device. As more particularly explained below, for example, the user input interface can include one or more directional keys (hard and/or soft keys) for directionally selecting ordered items, such as ordered channels of content.

Referring back to FIG. 1, the LAN 12 may comprise a private network contained within a home, such as in accordance with the Digital Living Network Alliance (DLNA) architecture and/or the UPnP™ (Universal Plug and Play) architecture. In this regard, the LAN and any devices or other entities directly or indirectly coupled to it may be grouped into one or more personal networks (although the case of a single personal network will be described in greater detail below). A personal network may be referred to as a personal device cluster (PDC) 14, and although a PDC may include multiple devices connected via one or many networks, the PDC need only include at least one device and, in one embodiment, includes only a single device.

Generally, a PDC 14 may have an owner and be identified by a unique identifier such as a series identifier (SID); and devices within the PDC may be identified by unique identifiers such as endpoint identifiers (EIDs). Devices within a PDC may be referred to as members of that PDC, or PDC devices. As shown in FIG. 1, for example, the LAN 12, mobile device 16a, APs 18a and 18b, media server/renderer 20, 22a and media renderers 22b and 22c may be members of the same PDC. As illustrated, visitor mobile device 16b is not a member of the same PDC as the other devices, but may be a member of another PDC. As shown and described herein, the framework of exemplary embodiments of the present invention may control access to resources of a PDC by devices of other PDCs (including the illustrated visitor mobile device).

PDC devices may establish their membership in a respective PDC 14 in any of a number of different manners. In this regard, the PDC may be configured such that devices establish their membership in a PDC in accordance with public key infrastructure (PKI)-based techniques. In one particular example, the members of the PDC may be made aware of a public/private key pair of an owner of the PDC, and the SID of the PDC may be a cryptographic hash of the owner's public key. In such an instance, any member may securely authenticate incoming traffic as originating from another member, or as originating from a device belonging to another PDC, such as in accordance with a PKI challenge-response technique.

In another example of members establishing their membership in a PDC 14, the members of the PDC may exchange and maintain trusted membership information including the EIDs of the respective members, such as in accordance with a replication-based technique. The EID of each member may be a cryptographic hash of a public key of the respective member. Thus, in instances in which a member receives incoming traffic identifying its originator by the EID of another member, the member may authenticate the traffic by authenticating that the originator is in possession of the respective private key of the other member.

In the UPnP™ architecture, with which the system 10 may be configured to operate, physical devices may be configured to function as devices, services and control points. Control points may include software applications and constitute the active components of the UPnP™ architecture. Devices may include physical or logical entities, enumerated via simple eXtensible Markup Language (XML) descriptions and contain Application Programming Interfaces (APIs) referred to as services. Physical devices may host multiple logical devices. Generally, then, a device may refer to a physical device or a logical device hosted by a physical device. Each physical or logical device may host multiple services.

Services are groups of states and actions. For example, a light switch has an "on" state and an "off" state. An action allows the network to determine the state of the switch or to change the state of the switch. Services typically reside in devices. Services may also include one or more so-called "user-services" that may be perceived by a user (e.g., printing); and each of these user-services may include one or more underlying, so-called "elementary-services" about which the user may be unaware. In the embodiment shown in FIG. 1, for example, the mobile devices 16a, 16b and media renderer 22c may function as control points; and the media server/media renderer 20, 22a and media renderer 22b may function as devices/services. Reference may be made herein to UPnP™ control points, devices and services. It should be understood, however, that the system of exemplary embodiments of the present invention may be configured in accordance with any of a number of other architectures in which the system and its devices may be configured to operate as described herein.

As indicated above, exemplary embodiments of the present invention generally provide a security framework for consistent and intuitive user interaction to manage access control in smart-spaces, such as a PDC 14. The security framework of exemplary embodiments of the present invention may be implemented wholly or partially in middleware between the user domain and the system domain. The security framework may provide authentication, authorization, privacy and/or fine-grained access control to protect the resources (devices, services and content) in a user's PDC and allow for easy and secure sharing with others members of the respective PDC.

As indicated above, exemplary embodiments of the present invention generally provide a security framework for consistent and intuitive user interaction to manage access control in smart-spaces, such as a PDC 14. The security framework of exemplary embodiments of the present invention may be implemented wholly or partially in middleware between the user domain and the system domain, and as such, may be referred to herein as a security middleware. The security framework may provide authentication, authorization, privacy and/or fine-grained access control to protect the resources (devices, services and content) in a user's PDC and allow for easy and secure sharing with others members of the respective PDC.

According to exemplary embodiments of the present invention, intuitive access control management may be provided based on the real-world metaphor of "passes" or "tickets," implemented in a passlet mechanism whereby a user grants a "passlet" to prescribe the high-level permissions the user desires to grant the passlet's recipient. The security framework of exemplary embodiments translates user-level permissions carried in passlets to the appropriate system-level settings from which access control decisions may be made. A user can use the passlet management tools on any of user's devices (passlet generating devices—PGDs) to create passlets that may allow the recipient of the respective passlets to access any target resources in the user's PDC 14. In a similar manner, a user can use a passlet the user has received to access the prescribed resources from any device in the user's PDC. At any point, the user may have the choice to revoke any passlet that the user has already granted by using any of the user's devices. After the revocation action propagates to the target device, any future access attempts by the passlet's recipient may accordingly be denied. If so desired, however, the revoking user can later choose to reinstate or permanently delete any revoked passlet.

There may be two types of passlets, i.e., device passlets and service passlets. A device passlet grants full access to all services hosted by a specific passlet target device (PTD). Additionally, a device passlet may offer a way to allow access to services for which granting explicit service passlets is not possible, such as in the case of legacy applications (implementing respective services) not otherwise configured according to the security framework of exemplary embodiments of the present invention. Service passlets grant selective access to functionality exposed by respective services such that the user can create a passlet for a specific service running on a specific device. It is also possible to give "PDC-wide" access to a service by granting access to all instances of the specific service running on any member of a particular PDC 14. It is also possible to create a service passlet that limits access to a single item of content or a specific set of items of content. In the absence of a user including a device or service passlet granting access to a device or service, the PDC and its devices may be configured to block access to all hosted services by default.

In order to enforce fine-grained access control to devices, services and content, each media server 20 and media renderer 22 in a PDC 14 may operate or otherwise implement a dynamic firewall that intercepts at least a portion, if not all, traffic before that traffic reaches any service hosted by the respective media server/renderer. In this regard, in the nomenclature of the client-server computing model, a request/response to access a resource (device, service, content, etc.) may be made between a client operating on a control point (e.g., mobile device 16) and a server operating on a media server/renderer. In this context, the client and server may be applications or processes implementing the respective control point, and device and/or service of the media server/renderer, or may be interfaces to these applications or processes.

The firewall may be controlled by a security control module of the security framework of exemplary embodiments of the present invention. This control module may, in turn, be configured to allow or reject captured traffic based on security policies expressed by the user through the granting of passlets, as well as information contained in documents that describe the user-permissions and their system mappings corresponding to a user-service, referred to herein as service mapping documents (SMDs). To permit PDC-wide coordination of firewalls, the security framework may include a replication mechanism (referred to herein as a PDC-store) that enables the coordination of the device firewalls, thus allowing for cluster-wide programming of the dynamic firewalls through the issuing of passlets.

Each PDC 14 may maintain a distributed PDC-store that includes certain information related to the PDC, which may be replicated across all PDC devices. In this regard, updating of information in a device's PDC store may be limited to only those devices authenticated as being members of the same PDC, thereby providing for trusted updating of information in the PDC-store. When a device (PGD) of one PDC issues a passlet and sends it to a passlet recipient device (PRD) of another PDC, this passlet may be replicated in "sent-passlets" repositories of the PDC-stores of all members of the PDC including the PGD. As shown in FIG. 1, for example, mobile device 16a may function as a PGD, and visitor mobile device 16b may function as a PRD. In addition to receiving the passlet from the PGD, the PRD may replicate the passlet in "received-passlets" repositories of the PDC-stores of all members of its own PDC. When a device in the PRD's PDC sends a request to the PTD in the PGD's PDC, the security framework implemented at the PTD may authenticate that the requesting device belongs to the PDC including the PRD, and is so, may pass the request by the firewall to a local server process that implements the service. Otherwise, the request may be rejected.

According to exemplary embodiments of the present invention, services may be distinguished into "aware" services or legacy services (where these services may alternatively be referred to by the applications implementing the respective services, i.e., "aware" applications or legacy applications). "Aware" services may be those services written for use with APIs configured according to exemplary embodiments of the present invention. More particularly, "aware" services may be configured to use an API exported by the security framework to return a response (to a requesting device) that is tailored based on the passlets the requesting user has received from the owner of the service-providing device. In this case, access control may be achieved by regulating the responses of distributed services. Thus, "aware" services may be configured to take full advantage of the security framework, but may require writing or re-writing applications to use an API configured for use with the framework of exemplary embodiments of the present invention.

Legacy services may be those services that were not written with the security framework in mind, or otherwise designed and operable without regard to the security framework. Legacy services can be further distinguished into "enabled" services for which support for the security framework has been added; and "transparent" services about which the security framework is unaware. "Enabled" services may be implemented by legacy applications without any modifications, for which there may exist an SMD as part of the security framework of exemplary embodiments of the present invention. The dynamic firewall, in conjunction with the security control module, may decide which requests reach "enabled" servers implementing services running on the device based on the passlets the owner of the respective device has granted to the requesting user. In this case, access control may be achieved by regulating the requests to distributed services. Although "enabled" services may not be configured to take full advantage of the security framework, fine-grained access control may still be achieved without requiring any modifications to the binaries of the distributed middleware and applications implementing such services.

"Transparent" services may be those legacy services without any modifications, and for which no SMD exists as part of the security framework of exemplary embodiments of the present invention. The security framework may impose ON/OFF access control to these services through the use of device passlets. The security framework may allow the download and installation of SMDs for these services as they become available, thus making them "aware" and allowing the user to create service passlets for them.

Reference is now made to FIG. 3, which illustrates a functional block diagram of the security framework 34 of exemplary embodiments of the present invention. To enforce fine-grained access control, the security framework is implemented or included on each device (e.g., media server 20, media renderer 22) a dynamic firewall 36 that may be configured to intercept at least some, if not all, incoming traffic (e.g., IP traffic) before it reaches servers implementing respective services, including "aware" services 38, "enabled" services 40 and/or "transparent" services 42, hosted on that device. In this regard, the firewall may be configured to assemble incoming traffic into captured traffic units (CTUs) based on filters provided by a control module 44. These filters may describe which incoming traffic to capture and how to assemble it into CTUs, and may be referred to herein as service mapping document filters (SMD filters). Also, these SMD filters may be derived from SMDs, and as such, may be continuously updated as new SMDs are installed into the security framework.

The firewall 36 may be configured to receive an ordered list of SMD filters from the control module 44, the last SMD filter of which may be a default filter that directs the firewall to capture any traffic that is not captured by any of the previous SMD filters in the list. The control module may be configured to derive these SMD filters from information provided by a SMD module 46, which may be configured to parse available SMDs 48 when those SMDs are installed by the security middleware. SMDs may only be available for "aware" and "enabled" services 38, 40, with these services being those for which a user may exert access control by issuing service passlets. A "transparent" service may be a service for which access control may only be exerted through device passlets, such as until the user (or a middleware agent on the user's behalf) finds and installs a corresponding SMD (thus making the "transparent" service an "enabled" service).

SMDs 48 may comprise XML or other formatted documents that include information describing user-permissions and their system mappings corresponding to user-services (typically one SMD being associated with one user-service). As shown in FIG. 4, for example, an SMD may include three main sections, namely, a service-description section 50, a permission-list section 52 and an action-response-list section 54. The service description section may include a description of the user-service, such as friendly names and descriptions, icons, service categories, pointers to the location of the user-service (or locations of elementary-services that implement the respective user-service), and/or other data related to the user-service. In addition, the service description section may include a description of respective elementary system services, as well as a list of one or more SMD filters corresponding to the respective elementary-services.

The permission-list section 52 of the SMD 48 may, but need not (for example in the case of dynamically created content as noted below), include a description of a number of the user-level permissions that the framework 34 associates with the user-service described in the respective SMD. Each permission description, in turn, may include one or more labels of text that may be displayed to the user via a user interface (UI) tool when capturing the user's intent with respect to the respective permission, and a list of one or more user parameters that capture the user's intent with respect to the respective permission. A number of the user parameters that capture the user's intent with respect to a particular permission may be filled directly through an appropriate UI tool. In some cases, though, a client application may be invoked at the PGD to assist the user to make a fine-grained selection. For example, a PGD that is issuing a passlet for a media server 20 hosted in another PDC device may need to invoke a control-point client application to allow the user to specify which content to share, such as in the case of dynamically created content.

Each permission description in the permission-list section 52 of the SMD 48 may also include a list of one or more actions that may be mapped to the respective permission. Each of at least some of these action entries may include the ID of an SMD filter to capture the respective action, an action name, one or more action parameters (arguments) that may be to be used in making a decision, and/or one or more conditions that the user and action parameters may need to satisfy for the action to be allowed.

In addition to the foregoing, an SMD 48 may include an action-response-list section 54, which may list one or more actions and responses returned to the user when the respective one or more actions are rejected. The other actions may be rejected by the firewall 36 in a more "silent" manner.

For the user-service described in each SMD 48, the control module 44 may be configured to receive, from the SMD module 46, information including an ordered list of SMD filters that may be obtained by scanning the service description section 50 of the SMD. Each SMD filter may correspond to one of the elementary services that implement the user-level service, and may describe the CTUs to be captured by the firewall 36. In addition, the information received by the control module (from the SMD module) may include a list of one or more user-permissions associated with the user-service, the mappings of user-permissions to system remote procedure calls (RPCs)/actions (as used herein, RPCs and actions may generically be referred to as "actions"). The information may further include one or more rules based on which RPCs/actions are to be allowed by the firewall 36, where at least some, if not all, RPCs/actions may be rejected unless those RPCs/actions satisfy the conditions set by the rules(s). Further, the information may include the error responses for a subset of the RPCs/actions corresponding to the user-service. As indicated above, these error responses may be returned by the firewall when an RPC/action is rejected.

Examples of SMD filters derivable from SMDs 48 are depicted in FIG. 5. Each SMD filter may be defined as a hierarchical stack of known protocol layers, starting from layer 1 (IP layer) and ending on the highest layer that may be required by the firewall 36 to unambiguously demultiplex incoming traffic into the appropriate CTU. The protocol layers included within a SMD filter may include one or more of the following:

1. IP layer
2. Transport layer, e.g., TCP (Transmission Control Protocol) and port number, UDP (User Datagram Protocol) and port number
3. Service transport layer, e.g., HTTP (Hypertext Transport Protcol), HTTPU (HTTP Unicast), RTP (Real-Time Transport Protocol)
4. Service invocation layer, e.g., SOAP (Simple Object Access Protocol), XML-RPC (XML-Remote Procedure Call), Sun-RPC, SSDP (Simple Service Discovery Protocol), etc.
5. Service identification layer—Distinguishes among individual services that use the same service invocation layer, e.g., elementary UPnP services such as ContentDirectory:1, ConnectionManager:1 or other services.

In addition to the foregoing information, the SMD module 46 may be configured to provide, to the control module 44, service description metadata contained in the SMDs 48. The control module may then be configured to create service records, which may be stored in a service repository 56 in the PDC-store 58, and propagated across all PDC devices of the respective PDC 14. Each PDC device may therefore become aware of services available from all other PDC devices and, therefore, can issue passlets for these services.

As indicated above, the firewall 36 may be configured to inspect all incoming traffic (e.g., IP traffic) and process the list of SMD filters in order until the firewall finds the first filter that matches the respective traffic. The firewall may be configured to capture each unit of incoming traffic according to one SMD filter, with the default SMD filter directing the firewall to capture all traffic not captured by any of the other SMD filters. For an example of how a CTU may be assembled when the SMD filters of FIG. 5 are installed by the firewall, see FIG. 6.

Returning to FIG. 3, once the firewall 36 has assembled a CTU from traffic captured according to one of its SMD filters, the firewall may be configured to pass the CTU to the control module 44 for deciding whether the CTU will be allowed to pass to a respective service (e.g., via an appropriate network API 60) or rejected based on the security policies expressed by the user through the granting of passlets. The control module may be configured to calculate these policies by using information contained in passlet repositories found in the PDC-store 58. In this regard, the framework 34 may further include user interface (UI) tools, such as a passlet manager 62, configured to communicate with the control module (e.g., via one or more appropriate APIs 64) for creating, revoking and/or viewing passlets. To create a passlet for a selected service, the passlet manager may be configured to retrieve, from the SMD module 46 directly or via the control module, one or more available user-level permissions for the selected service.

Once a passlet is created, the control module 44 of the PGD may be configured to send the passlet to its PRD, and store the passlet in a "sent-passlets" repository 66 of the PDC-store 58. The PRD's control module may be configured to receive the new passlet, and store the passlet in the "received-passlets" repository 68 of its PDC-store. The passlet manager 62 may also be configured to use the control module to revoke any of the passlets in the "sent-passlets" repository, which may then be stored in the "revoked-passlets" 70 repository of the PDC-store. As indicated above, framework 34 may be configured such that the passlet repositories are replicated across at least some, if not all, of the devices of a respective PDC 14, such as via an appropriate gossip protocol. Finally, the passlet manager may be configured to retrieve all, of the sent, received and revoked passlets from the local PDC-store, such as for review by the user.

The control module 44 may itself maintain a user-PIN and/or one or more preferences 72 that permit the control module to protect certain control functions. Adding and removing a device to the PDC 14 may be protected by requiring authentication of the user with the user-PIN. Other functions that may be protected, depending on the user preferences, include for example, granting and revoking passlets, and/or linking to another user's PDC.

Generally, device and service passlets may include information about who is giving permission (From:), to whom (To:), for how long (When:), and to what resources (What:). The user-friendly representation of this information that is contained in the passlets may be exposed to the users, while the system representation may be used by the framework 34 to make access control decisions.

Passlets may define user-level permissions, which may be permissions that are meaningful to users. The user-friendly part of the information contained in passlet may be represented by the SMD and be exposed to the user (e.g., a text description with a tick-box or a pull-down menu of options), and the system representation (i.e., a permission parameter of a certain type), whose value may be set as a result of the user input but may not be shown to the user. Passlet permission parameters may be of the following types: "boolean," "enumeration," "number," "list of numbers," "string," "list of strings" or the like. For example, when creating a passlet to specify what access to grant to a Web browsing service, a user may select (with the passlet manager 62) the directories or files the user wants to share with a recipient of the passlet. In doing so, under the cover, the user may assign a list of content URI strings to the passlet's permission parameter "browsing_list'," which may be of type "list of strings."

System-level permissions may be derived from the passlet's user-level permissions based on the mappings found in the user-service's SMD 48. The SMD may describe, for each elementary-service implementing a user-service, those RPCs/actions that should be allowed, depending on the passlet's permission parameters. For example, a Web browsing SMD may specify that an incoming HTTP-GET captured by a corresponding Web browsing SMD filter should be allowed, if its parameter "URI" has a value that matches any string in the passlet permission parameter "browsing_list."

There are a number of fields that are common to all passlets. These fields may include information about who is giving permission and may include, for example, the PGD's EID and/or device-friendly name, and/or the PGD owner's SID and/or owner-friendly name. Information about to whom the permission is being given may include, for example, the PRD's EID and/or device-friendly name, and/or the PRD owner's SID and/or owner-friendly name. In this regard, the PRD owner's SID may be the SID that in many cases identifies the recipient of the permissions within the passlet, whereby any EID that belongs to this SID may be given access.

The information about for how long the permission is being given may include, for example, a passlet creation time and/or a passlet expiration time. In this regard, the passlet expiration duration may have a minimum (e.g., one day to avoid strict requirements of clock synchronization and account for propagation delays) and/or a minimum (e.g., one year) for security reasons, although the user may revoke a passlet at any time before it expires.

Passlets may also include a passlet ID (e.g., unique 128-bit identifier), and/or a PDC-wide flag that may comprise a Boolean that is true when the passlet gives access to any instance of the respective service running on any PDC device (for device passlets, this is likely always false. If it were true, then the PRD might be granted unhindered access to all the devices in the PDC of the PGD).

The information about what resources permission is being given may include, for example, the PTD's EID and/or device-friendly name, the PTD owner's SID and/or owner-friendly name, and/or one or more device permission parameters that may include a parameter (e.g., "allow-all") that permits full access to a particular device. For service passlets, the information about what resources permission is being given may also include, for example, the PTD's EID and/or device-friendly name, the PTD owner's SID and/or owner-friendly name, although this information may not be used if the PDC-wide flag is true. In addition, service passlets may include one or more service permission parameters that may include a parameter (e.g., "allow all") that permits full access to a particular service.

In addition to or in lieu of merely implementing service and/or device passlets, the framework 34 (e.g., control module 44) may create cumulative passlets for each of the users or user-groups for which a passlet exists, such as by scanning all received and sent passlets in the respective repositories 58, 60 of the PDC-store 52 during initialization of the framework. Cumulative passlets are internal structures created and maintained by the framework, and that express the overall cumulative effect of all individual passlets granted or received by the user. A general illustration of the information in a cumulative passlet is shown in FIG. 7.

Cumulative passlets may include sent-cumulative passlets created from the contents of the sent-passlets repository 58, and received-cumulative passlets created from the contents of the received-passlets repository 60. A sent-cumulative passlet may express the overall permissions that the owner of the local PDC 14 has granted to a remote user or user-group, such as a remote user or user-group of another PDC 14. Thus, when a device in that user's PDC attempts to access a service of the PGD's PDC, a passlet server device (PSD) hosting the respective service (may be the PTD unless the passlet is for a PDC-wide service) may be configured to look for the existence and the contents of a sent-cumulative passlet for that remote user in order to make an access control decision. Similarly, a received-cumulative passlet may express the overall permissions that the owner of a remote PDC has granted to the owner of the local PDC. A received-cumulative passlet is typically not used to enforce access control, but may instead be useful to avoid access requests that are known to be rejected because of lack of permissions. Both sent- and received-cumulative passlets may be used by a UI tool (e.g., passlet manager 54) to show the user the complete current picture of the permissions that the user has received or granted through the use of passlets. A GUI presentation to the user could be conceptually based on FIG. 7.

Cumulative passlets provide an up-to-date snapshot of the cumulative permissions granted to a user or by a user though a series of passlets. As such, cumulative passlets may be continuously updated, and may not have a duration or expiration time. At the initialization phase, for example, the security framework 34 (e.g., control module 44) may be configured to scan all received and sent passlets that have not been revoked or expired, and create cumulative passlets for each of the users or user-groups for which a passlet exists. During regular operation, the framework (e.g., control module) may continuously create new and/or update existing cumulative passlets based on the following events: new passlet received, new passlet sent, existing passlet revoked, existing passlet expired.

It is also important to note that the creation and maintenance of sent-cumulative passlets is a trusted operation, thereby allowing PDC devices to use sent cumulative passlets to enforce access control. After a user grants a passlet, the PGD may be configured to save it in the sent-passlets repository 58 of the local PDC-store 52. The framework may then propagate the new passlet to the PDC-stores of at least some, if not all, other PDC devices, ensuring that the update will eventually reach the PTD. The PDC-store content replication may be a trusted and secure (authenticated, encrypted, integrity checked) operation available only to devices in the same PDC. Therefore, the PSD may trust the information in the sent-passlets repository in its local PDC-store to create and maintain sent passlets, and use them to make access control decisions.

Reference is now made to FIG. 8, which illustrates a flowchart including various steps in a method of managing access to a network resource according to one exemplary embodiment of the present invention. The method may include the firewall 36 of a PTD receiving incoming traffic destined for a service hosted by the PTD, where the incoming traffic may request access to the respective service and include one or more RPC/actions and parameter values associated with that request. The firewall may assemble incoming traffic into a CTU based on filters provided by the control module 44. Then, as shown at block 80, the control module 44 may receive the CTU from the firewall 36, where the CTU may include incoming traffic, information about which SMD filter captured the CTU, the respective RPC/actions and RPC/action's parameter-value pairs, as well as the EIDs of the requesting device (EIDs) and the destination device (EIDd). For example, a SMD filter specified in a Web browsing SMD may direct the firewall to capture an HTTP CTU and pass the action "GET" and parameter-value pair (URI, http://phone.dimitris/videos/public/index.html) to the control module.

After receiving the CTU, the control module 44 may determine if the requesting device (EIDs) is a member of the same PDC 14, as shown in block 82. If the requesting device is a member of the same PDC, the control module may instruct the firewall 36 to allow the CTU to proceed to the server implementing the respective service, which then proceeds to service the request as usual, as shown in block 84. Otherwise, if the requesting device is not a member of the same PDC, the control module may determine if a cumulative passlet exists for the owner of the requesting device, such as based upon the EIDs owner's SID (SIDn), as shown in block 86. If a cumulative passlet (and thus device or service passlet) does not exist for the owner of the requesting device, the control module may instruct the firewall to reject the CTU, silently or with a return error code as defined in the SMD for the respective service, as shown in block 88.

If a cumulative passlet does exist for the owner of the requesting device, the control module 44 may next determine if that cumulative passlet has a PDC-wide entry for the requested service; and if not, may determine if that cumulative passlet has an "allow all" true for the PTD (EIDd), as shown in blocks 90 and 92. If the cumulative passlet has an "allow all" true for the PTD, the control module may instruct the firewall 36 to allow the CTU to proceed to the server implementing the respective service, again as shown in block 84. If the cumulative passlet does not have a PDC-wide entry for the requested service, or an "allow all" true for the PTD, the control module may next determine if the passlet has an entry for the respective service hosted by the PTD (EIDd), as shown in block 94. If not, the control module may instruct the firewall to reject the CTU, as again shown in block 88.

If the control module 44 determines that the cumulative passlet does have a PDC-wide entry for the respective service, or determines that the cumulative passlet otherwise has an entry for the respective service, the control module may determine if the CTU's RPC/action maps to one or more user-permissions in the respective SMD 48, as shown in block 96. If not, the control module may instruct the firewall 36 to reject the CTU, as again shown in block 88. If the RPC/action does map to one or more user-permissions, however, the control module may determine if the CTU's RPC/action's parameter-value pairs pass the condition(s) defined in the SMD for the permission value found in the cumulative passlet (conditions that the user and action parameters may need to satisfy for the action to be allowed), as shown in block 98. If the parameter-value pairs do pass the respective condition, the control module may instruct the firewall 36 to allow the CTU to proceed to the server implementing the respective service (see block 84); otherwise, the control module may instruct the firewall to reject the CTU (see block 88).

According to one exemplary aspect of the present invention, the functions performed by one or more of the entities of the system, such as the mobile device 16, AP 18, media server 20 and/or media renderer 22, may be performed by various means, such as hardware and/or firmware, including those described above, alone and/or under control of a computer program or computer software. The computer program may be part of a computer program product for performing one or more functions of exemplary embodiments of the present invention. This computer program product may include a computer-readable storage medium, such as the non-volatile storage medium, and software including computer-readable program code portions, such as a series of computer instructions, embodied in the computer-readable storage medium.

In this regard, FIGS. 3, 6 and 8 are a functional block diagram, control flow diagram and flowchart, respectively, of systems, methods and program products according to exemplary embodiments of the present invention. It will be understood that each block or step of the functional block diagram and flowchart, and combinations of blocks in the functional block diagram and flowchart, can be implemented by various means, such as hardware, firmware, and/or software including one or more computer program instructions. As will be appreciated, any such computer program instructions may be loaded onto a computer or other programmable apparatus to produce a machine, such that the instructions which execute on the computer or other programmable apparatus (i.e., hardware) create means for implementing the functions specified in the block(s) or step(s) of the functional block diagram and flowchart. These computer program instructions may also be stored in a computer-readable memory that can direct a computer or other programmable apparatus to function in a particular manner, such that the instructions stored in the computer-readable memory produce an article of manufacture including instruction means which implement the function specified in the block(s) or step(s) of the functional block diagram and flowchart. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the block(s) or step(s) of the functional block diagram and flowchart.

Accordingly, blocks or steps of the flowcharts support combinations of means for performing the specified functions, combinations of steps for performing the specified functions and program instruction means for performing the specified functions. It will also be understood that one or more blocks or steps of the functional block diagram and flowchart, and combinations of blocks or steps in the functional block diagram and flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:
    a processor; and
    a memory comprising computer program code, the memory and computer program code configured to, with the processor, cause the apparatus to at least:
    receive a captured traffic unit intended for a network service, the captured traffic unit being one into which incoming traffic has been assembled based on a filter, from a list of one or more filters, describing which incoming traffic to capture and how to assemble the respective incoming traffic into the captured traffic unit;
    determine whether to allow the captured traffic unit to pass to one or more applications configured to implement the respective network service based on a passlet and a service mapping document for the respective network service, the passlet comprising one or more access permissions to a particular user for accessing the respective network service, or for accessing a device hosting the respective network service, and the service mapping document describing how to map one or more user-level permissions to one or more corresponding system-level actions; and
    cause instruction of a firewall to allow the captured traffic unit to pass to the respective one or more applications or to reject the captured traffic unit based on the determination.

2. The apparatus according to claim 1, wherein the one or more filters of the list of one or more filters describe how to assemble incoming traffic into different captured traffic units for different network services.

3. The apparatus according to claim 1, wherein the device hosting the network service for which the captured traffic unit is intended is within a personal network comprising a plurality of devices, each device within the personal network being configured to host one or more services, and each device within the personal network comprising a firewall configured to allow captured traffic units to pass to one or more applications configured to implement the respective one or more services.

4. The apparatus according to claim 1, wherein the memory and computer program code are configured to, with the processor, cause the apparatus to receive the captured traffic unit, determine whether to allow the captured traffic unit to pass to one or more applications, and cause instruction of the firewall to allow the captured traffic unit to pass to the respective one or more applications or to reject the captured traffic unit under control of a security framework implemented in middleware between a user-level domain and a system-level domain.

5. The apparatus according to claim 4, wherein being configured to cause the apparatus to determine whether to allow the captured traffic unit to pass to one or more applications comprises being configured to cause the apparatus to determine whether to allow the captured traffic unit to pass to one or more legacy applications designed and operable without regard to the security framework.

6. The apparatus according to claim 5, wherein the filter based on which the incoming traffic has been assembled into the captured traffic unit is associated with the network service for which the captured traffic unit is intended, and wherein being configured to cause the apparatus to determine whether to allow the captured traffic unit to pass to one or more applications comprises being configured to cause the apparatus to determine whether to allow the captured traffic unit to pass to one or more legacy applications for which support has been added to the security framework, based on the passlet comprising one or more access permissions to the particular user for accessing the respective network service.

7. The apparatus according to claim 5, wherein the filter based on which the incoming traffic has been assembled into the captured traffic unit is a default filter unassociated with any network service including the network service for which the captured traffic unit is intended, and wherein being configured to cause the apparatus to determine whether to allow the captured traffic unit to pass to one or more applications comprises being configured to cause the apparatus to determine whether to allow the captured traffic unit to pass to one or more legacy applications for which the security framework is unaware, based on the device passlet comprising one or more access permissions to the particular user for accessing the device hosting the respective network service.

8. A method comprising:

receiving a captured traffic unit intended for a network service, the captured traffic unit being one into which incoming traffic has been assembled based on a filter, from a list of one or more filters, describing which incoming traffic to capture and how to assemble the respective incoming traffic into the captured traffic unit;

determining whether to allow the captured traffic unit to pass to one or more applications configured to implement the respective network service based on a passlet and a service mapping document for the respective network service, the passlet comprising one or more access permissions to a particular user for accessing the respective network service, or for accessing a device hosting the respective network service, and the service mapping document describing how to map one or more user-level permissions to one or more corresponding system-level actions; and causing instruction of a firewall to allow the captured traffic unit to pass to the respective one or more applications or to reject the captured traffic unit based on the determination, wherein at least determining whether to allow the captured traffic unit and causing instruction of the firewall to allow or reject the captured traffic unit are performed by an apparatus comprising a processor and memory comprising computer program code, the memory and computer program code configured to, with the processor, cause the apparatus to at least determine whether to allow the captured traffic unit and cause instruction of the firewall to allow or reject the captured traffic unit.

9. The method according to claim 8, wherein the one or more filters of the list of one or more filters describe how to assemble incoming traffic into different captured traffic units for different network services.

10. The method according to claim 8, wherein the device hosting the network service for which the captured traffic unit is intended is within a personal network comprising a plurality of devices, each device within the personal network being configured to host one or more services, and each device within the personal network comprising a firewall configured to allow captured traffic units to pass to one or more applications configured to implement the respective one or more services.

11. The method according to claim 8, wherein receiving the captured traffic unit, determining whether to allow the captured traffic unit to pass to one or more applications, and causing instruction of the firewall to allow the captured traffic unit to pass to the respective one or more applications or to reject the captured traffic unit occur within a security framework implemented in middleware between a user-level domain and a system-level domain.

12. The method according to claim 11, wherein determining whether to allow the captured traffic unit to pass to one or more applications comprises determining whether to allow the captured traffic unit to pass to one or more legacy applications designed and operable without regard to the security framework.

13. The method according to claim 12, wherein the filter based on which the incoming traffic has been assembled into the captured traffic unit is associated with the network service for which the captured traffic unit is intended, and wherein determining whether to allow the captured traffic unit to pass to one or more applications comprises determining whether to allow the captured traffic unit to pass to one or more legacy applications for which support has been added to the security framework, based on the passlet comprising one or more access permissions to the particular user for accessing the respective network service.

14. The method according to claim 12, wherein the filter based on which the incoming traffic has been assembled into the captured traffic unit is a default filter unassociated with any network service including the network service for which the captured traffic unit is intended, and wherein determining whether to allow the captured traffic unit to pass to one or more applications comprises determining whether to allow the captured traffic unit to pass to one or more legacy applications for which the security framework is unaware, based on the device passlet comprising one or more access permissions to the particular user for accessing the device hosting the respective network service.

15. A computer-readable storage medium having computer-readable program code portions stored therein, the computer-readable storage medium comprising a non-transitory computer-readable storage medium, the computer-readable storage medium and computer-readable program code portions being configured to, with a processor, cause an apparatus to at least:

receive a captured traffic unit intended for a network service, the captured traffic unit being one into which incoming traffic has been assembled based on a filter, from a list of one or more filters, describing which incoming traffic to capture and how to assemble the respective incoming traffic into the captured traffic unit;

determine whether to allow the captured traffic unit to pass to one or more applications configured to implement the respective network service based on a passlet and a service mapping document for the respective network service, the passlet comprising one or more access permissions to a particular user for accessing the respective network service, or for accessing a device hosting the respective network service, and the service mapping document describing how to map one or more user-level permissions to one or more corresponding system-level actions; and cause instruction of a firewall to allow the captured traffic unit to pass to the respective one or more applications or to reject the captured traffic unit based on the determination.

16. The computer-readable storage medium according to claim 15, wherein the one or more filters of the list of one or more filters describe how to assemble incoming traffic into different captured traffic units for different network services.

17. The computer-readable storage medium according to claim 15, wherein the device hosting the network service for which the captured traffic unit is intended is within a personal network comprising a plurality of devices, each device within the personal network being configured to host one or more services, and each device within the personal network comprising a firewall configured to allow captured traffic units to pass to one or more applications configured to implement the respective one or more services.

18. The computer-readable storage medium according to claim 15, wherein the computer-readable storage medium and computer-readable program code portions are configured to, with the processor, cause the apparatus to receive the captured traffic unit, determine whether to allow the captured traffic unit to pass to one or more applications, and cause instruction of the firewall to allow the captured traffic unit to pass to the respective one or more applications or to reject the captured traffic unit under control of a security framework implemented in middleware between a user-level domain and a system-level domain.

19. The computer-readable storage medium according to claim 18, wherein being configured to cause the apparatus to determine whether to allow the captured traffic unit to pass to one or more applications comprises being configured to cause the apparatus to determine whether to allow the captured traffic unit to pass to one or more legacy applications designed and operable without regard to the security framework.

20. The computer-readable storage medium according to claim 19, wherein the filter based on which the incoming traffic has been assembled into the captured traffic unit is associated with the network service for which the captured traffic unit is intended, and wherein being configured to cause the apparatus to determine whether to allow the captured traffic unit to pass to one or more applications comprises being configured to cause the apparatus to determine whether to allow the captured traffic unit to pass to one or more legacy applications for which support has been added to the security framework, based on the passlet comprising one or more access permissions to the particular user for accessing the respective network service.

21. The computer-readable storage medium according to claim 19, wherein the filter based on which the incoming traffic has been assembled into the captured traffic unit is a default filter unassociated with any network service including the network service for which the captured traffic unit is intended, and wherein being configured to cause the apparatus to determine whether to allow the captured traffic unit to pass to one or more applications comprises being configured to cause the apparatus to determine whether to allow the captured traffic unit to pass to one or more legacy applications for which the security framework is unaware, based on the device passlet comprising one or more access permissions to the particular user for accessing the device hosting the respective network service.

22. An apparatus comprising:

means for receiving a captured traffic unit intended for a network service, the captured traffic unit being one into which incoming traffic has been assembled based on a filter, from a list of one or more filters, describing which incoming traffic to capture and how to assemble the respective incoming traffic into the captured traffic unit;

means for determining whether to allow the captured traffic unit to pass to one or more applications configured to implement the respective network service based on a passlet and a service mapping document for the respective network service, the passlet comprising one or more access permissions to a particular user for accessing the respective network service, or for accessing a device hosting the respective network service, and the service mapping document describing how to map one or more user-level permissions to one or more corresponding system-level actions; and means for causing instruction of a firewall to allow the captured traffic unit to pass to the respective one or more applications or to reject the captured traffic unit based on the determination.

* * * * *